(12) United States Patent
Dhua (10) Patent No.: US 9,672,436 B1
(45) Date of Patent: Jun. 6, 2017

(54) INTERFACES FOR ITEM SEARCH (71) Applicant: A9.com, Inc., Palo Alto, CA (US)

(72) Inventor: Arnab Sanat Kumar Dhua, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 213 days.

(21) Appl. No.: 14/445,866

(22) Filed: Jul. 29, 2014

(51) Int. Cl.
*H04N 5/232* (2006.01)
*G06K 9/32* (2006.01)
*G06K 9/20* (2006.01)
*G06K 9/22* (2006.01)
*G06F 17/30* (2006.01)

(52) U.S. Cl.
CPC ..... *G06K 9/3233* (2013.01); *G06F 17/30864* (2013.01); *G06K 9/2081* (2013.01); *G06K 9/22* (2013.01); *H04N 5/23216* (2013.01); *H04N 5/23293* (2013.01)

(58) Field of Classification Search
CPC .................................................. H04N 5/23293
USPC .................................................. 348/333.02
See application file for complete search history.

(56) References Cited

U.S. PATENT DOCUMENTS

| | | | | |
|---|---|---|---|---|
| 6,433,818 B1* | 8/2002 | Steinberg | ........... | G07C 9/00142 348/161 |
| 2013/0127892 A1* | 5/2013 | Moore | ................ | G06T 11/001 345/582 |
| 2013/0201354 A1* | 8/2013 | LaScolea | ................ | G06F 3/005 348/207.1 |
| 2013/0336523 A1* | 12/2013 | Ruan | ....................... | G06K 9/62 382/103 |
| 2014/0152847 A1* | 6/2014 | Zomet | ................ | G06Q 30/0629 348/207.1 |
| 2014/0152875 A1* | 6/2014 | Tobin | ................ | H04N 5/23293 348/239 |
| 2015/0234514 A1* | 8/2015 | Kelly | ................ | G06F 3/04847 345/173 |

* cited by examiner

*Primary Examiner* — Anthony J Daniels
(74) *Attorney, Agent, or Firm* — Hogan Lovells US LLP (57) ABSTRACT

Searching for items, such as apparel items, can be performed using a set of category-specific outlines or contours from which a user can select. The outlines enable a user to quickly specify a relevant category, and provide guidance as to how to orient the camera in order to enable an item to be identified in an image without the need for an expensive object identification and segmentation process. The outline can specify a "swatch" region, indicating where the user should position a view of a pattern, texture, or color of the item in which the user is interested. The category selection and swatch region data can be used to determine matching items. If the user wants a different set of search results, the user can select a different outline, causing a new query to be executed with updated category information and swatch data to obtain new search results.

20 Claims, 8 Drawing Sheets

INTERFACES FOR ITEM SEARCH

BACKGROUND

Users are increasingly utilizing electronic devices to obtain various types of information. For example, a user wanting to purchase a shirt might access an electronic marketplace in order to search the types of shirts offered through that marketplace. Unless the user knows an exact brand or style of shirt that the user wants, however, the user might have to search through hundreds or thousands of different shirts using various options to attempt to locate the type of shirt in which the user is interested. If the user is interested in a shirt of a specific type in a certain color or pattern, the user might have no option but to sift through these results, potentially only being able to narrow the results by men's or women's shirts, general styles, price, or other such options. Such a process can be time consuming and potentially frustrating for a user, which can result in the user not locating an item of interest and the marketplace not completing a transaction.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to locating information about items using an electronic device. In particular, various embodiments provide a set of category-specific outlines or contours from which a user can select. The ability to quickly determine and select a category using the outlines not only can provide for a satisfying user experience, but can also provide guidance for a user as to how to orient an object within a field of view of a camera in order to enable the object to be identified without the need for an expensive object identification and segmentation process. The outline can also include an outline portion or other indicator of a region of interest within the outline, referred to herein as a "swatch" region. The user can view a portion of the image that includes a pattern, texture, or color of the object in which the user is interested, and can cause a "virtual swatch" corresponding to the region to be used in searching for similar items. By using the category selection and swatch region, information for a pattern, color, and/or texture and category information can be determined, at relatively little expense, that can be used to determine matching items. If the user wants a different set of search results, the user can select a different outline corresponding to another category, which can cause a new query to be executed with the updated category information and swatch data to obtain a new set of search results.

Various other functions and advantages are described and suggested below as may be provided in accordance with the various embodiments.

Figure 1A:
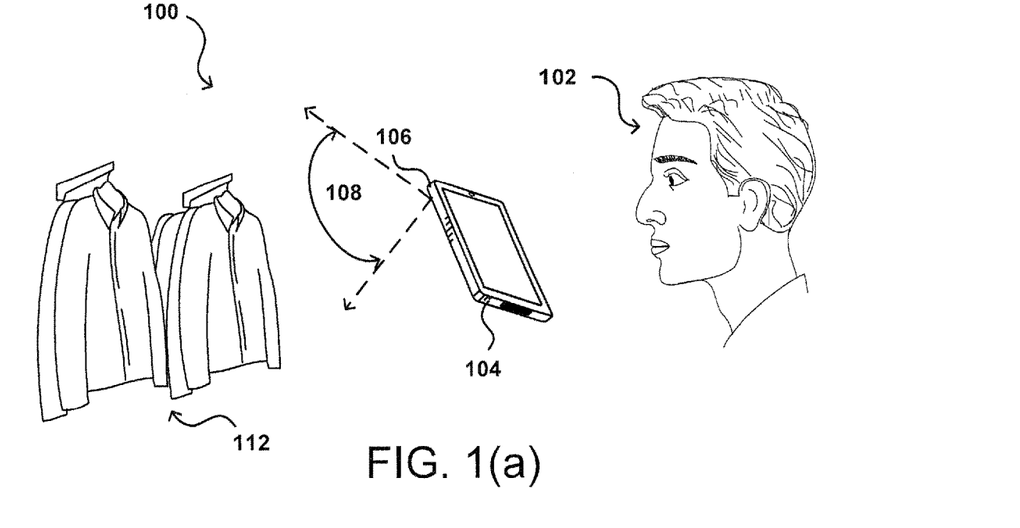
FIGS. 1(a) and 1(b) illustrate an example process in which a user can attempt to capture an image in an attempt to locate information about an item in accordance with various embodiments.
Figure 1B:
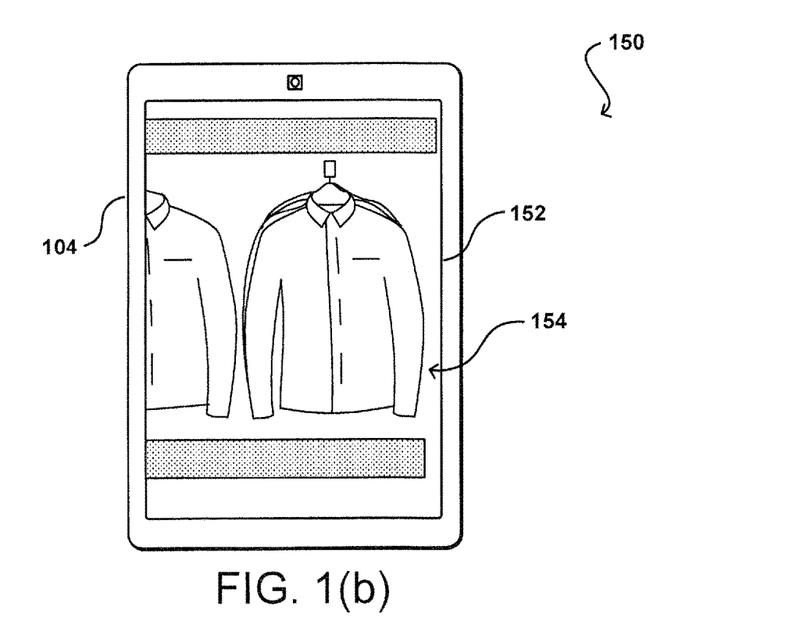

FIG. 1 illustrates an example situation 100 in which a user 102 is attempting to locate information for an item 112 in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more objects of interest 112 are within a field of view 108 of at least one camera 106 on the computing device. The camera might capture video, such that a "live" view of the captured video information can be displayed on a display screen 152 of the computing device 104, as illustrated in the example situation 150 of FIG. 1(b). In other embodiments, the camera might capture a still image 154 showing a representation of the object(s) of interest. In at least some embodiments, the image and/or a frame of the video can be analyzed, such as by analyzing on the device or uploading across a network to a service for analyzing image content.

Unfortunately, attempting to recognize an item, particularly an item of clothing, based on a mobile query image such as that illustrated in FIG. 1(b) can be difficult and extremely resource intensive. For example, it can be difficult to determine which portion of the image represents an object of interest to the user. For instance, in the example image 154 there are multiple shirts, hangars, and shelves represented in the image. Although a user might know that the shirt in front on the right is the object of interest, it can be significantly more difficult for a computer vision (or other such) algorithm to analyze the image, determine the portion corresponding to the specific garment, and then segment that portion from the background or remaining portion of the image. Further, even if the garment portion can be successfully segmented from the image, it can be difficult to determine the appropriate category or style of garment. For example, due in large part to the deformable nature of a garment, it can be difficult to determine whether the shirt is a man's shirt, woman's shirt, or child's shirt, as well as the exact style of shirt, for example, such as a man's polo shirt. While the first problem relates general image segmentation, the second problem relates to the fine-grained classification of non-rigid (i.e., deformable) objects, which can be particularly difficult.

Accordingly, approaches in accordance with the various embodiments attempt to guide the user to cause an image to be captured that includes a representation of an object in an identified region or portion of the image. Various approaches also enable the user to specify the type of item for which the user is searching. At least some of these approaches also attempt to match an item of the specified type using pattern and/or color information represented in a specific region of the image. In order to enable the user to quickly and easily cause such actions to be performed, various user interfaces are provided that enable a user to specify a particular category, such as an apparel category, and encourage the user to cause the interior of the item of clothing to be represented in a specific portion of the captured image data. Such an approach enables pattern and/or color matching to be performed using the appropriate portion of the image, and can provide results that are in (or based at least in part on) the specified category or type of item.

Figure 2A:
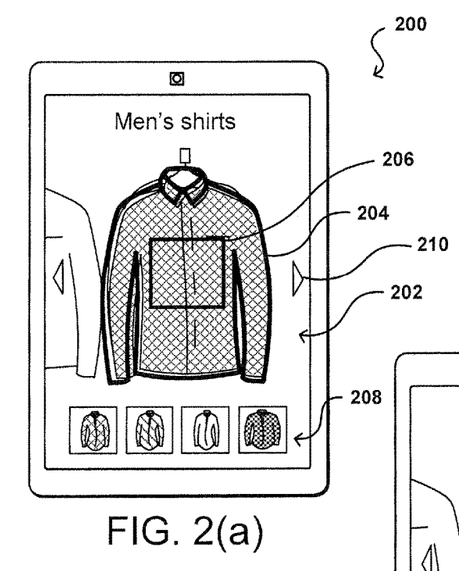
FIGS. 2(a), 2(b), 2(c), 2(d), 2(e), and 2(f) illustrate example interfaces that can enable a user to perform a search in accordance with various embodiments.

As an example, FIG. 2(a) illustrates a situation 200 wherein a user has opened a search interface on a computing device. The interface enables the user to specify that the user is interested in men's shirts in this example. By selecting the men's shirts category, a sub-category can be selected (by the user, device, or other) for which an outline 204 can be displayed. Although outlines are referred to in many examples herein, it should be understood that other types of visual indicators can be used as well, such as contours, point sets, geometric elements, and the like. In this example, the sub-category might be men's button down, long-sleeve dress shirts. As illustrated, there may be interface elements 210 that enable a user to quickly navigate (or swipe) to another category, which may then cause a different outline to be displayed. The outline can serve at least two purposes, as it can indicate the currently selected category to the user, as well as indicating the portion of the camera field of view in which to position the object, often through motion of the device. In this example, the outline 204 displayed over the captured image data 202 indicates that the user should move the device (or object, or both) until the representation of the object in the image data is substantially aligned with the outline, as illustrated in FIG. 2(a). In this example, the user has selected a category substantially matching the type of object in which the user is interested, whereby the user can position the camera with respect to the object such that the size and location of the representation of the object in the image substantially matches outline 204 as displayed. As mentioned, this enables the analysis to focus on the portion of the image contained within the outline, which significantly reduces the amount of resources otherwise needed to locating the object of interest and performing segmentation. Further, the selection of the outline provides a clear and straightforward way for the user to select or indicate the desired category in which to search.

Also as illustrated in FIG. 2(a), the graphical outline 204 includes an outline of a central region 206, referred to herein as a "swatch guide." The swatch guide enables the user to designate a virtual "swatch," or portion of the material indicating the pattern and/or color in which the user is interested. In many embodiments the swatch guide might be fixed in position with respect to the outline 204, while in other embodiments the user may be able to move and/or resize the swatch guide 206 within the overall outline 204 in order to ensure that the proper pattern and/or color is represented. In some embodiments where the swatch guide is fixed, the user can select the appropriate outline in order to indicate the proper category, and can then position the swatch guide such that the pattern and/or color of interest is represented in the swatch guide.

A benefit of using the category outline and the swatch guide is that only the portion of the image represented within the swatch guide needs to be analyzed for matching purposes in at least some embodiments. By selecting an outline that matches a men's long-sleeve, button-down shirt, for example, and then designating the pattern and/or color upon which to search, the search can be performed to match the pattern and/or color against items in the corresponding category (and potentially related categories). In at least some embodiments, the computing device can cause a query to be submitted to a matching service, for example, where the query indicates the indicated category and includes the swatch portion of the image, or information corresponding to the swatch portion. For example, in some embodiments a feature detection, computer vision, corners detection, or other such algorithm or process can be used to process the swatch portion of the image in order to determine information about the pattern and/or color(s) that should be used for searching. Any appropriate information useful for searching for an item based on a type and pattern and/or color information can be used as well within the scope of the various embodiments.

Figure 2B:
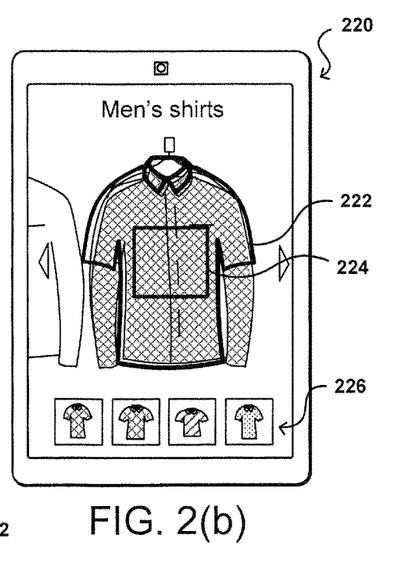

In response to the query, information for a set of search results can be returned to the device. Information for at least a subset 208 of these search results can be displayed along with the image and outline as illustrated in FIG. 2(a). The user can swipe, scroll, or otherwise navigate through the search results to attempt to locate an item of interest. Upon selection of a search result, any of a number of appropriate actions can be taken, such as to display a page with information for the item, provide an option to purchase the item, etc. An advantage of displaying the search results with the image and outline is that the user can quickly view the results and, if the user wants to obtain different and/or additional results, the user can change information such as the outline or swatch used for the search. For example, the user could use one of the navigation elements 210, or another such approach, in order to select a different outline. As a result, the device could display a different outline 222 for a different category or object type, such as is illustrated in the example situation 220 of FIG. 2(b). In this example, the user has selected a men's polo shirt category with a corresponding outline. The outline still helps guide the user to position the camera to have the representation of the object within the outline 222, even though the outline will not be a precise match. The user can still cause the pattern and/or color to be represented in the swatch region 224, which can be used to search for results matching the pattern and/or color of the swatch in the new category. As illustrated, updated search results 226 can be located and displayed that correspond to the new category selection.

Figure 2C:
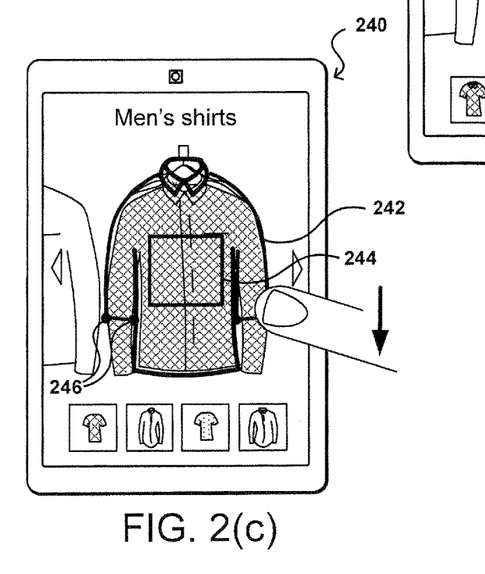

In some embodiments, a user might also be able to modify or adjust at least a portion of an outline that is displayed for a particular category. For example, in the situation 240 illustrated in FIG. 2(c) the user has used a finger to contact (or be positioned proximate) the display screen in a region associated with one or more control points 246, although such points may not be necessary in all embodiments. The user can move the finger in a direction appropriate to cause a desired change in the shape of the outline, such as by translating the locations of the control points relative to the display screen. In this example the finger movement has caused a change in the length of the sleeve of the shirt outline. The updated outline 242 and swatch guide 244 can be used to perform a new or updated search using the pattern and/or color information in the swatch region for the corresponding category, as well as information for the change in shape (or the new shape, etc.). The search can return results from the same category, for example, but can prioritize or rank shirts according to sleeve lengths that are closest to the specified sleeve length of the new outline. Such an approach can be particularly useful for items such as dresses, where a user might want to specify different lengths while searching within the same category. In some embodiments one or more user-selectable facets might also (or alternatively) be displayed that can enable the user to adjust the search criteria. For example, a user searching for dresses might be able to select facets such as sleeveless, strapless, and the like. These facets may be based at least in part upon the category selected, and may be updated with changes in the outline or category selection, among other such changes. The displayed facets may also be binned on the display, as is known for search applications.

Such an approach enables a user to perform various types of searches using pattern and/or color information. If the user is looking for information about a specific item, the user can select the corresponding category and cause image data to be captured of an appropriate region of the object of interest, in order to attempt to locate information about the specific item, such as a particular shirt that the user is interested in. Such a search can also enable the user to locate shirts of that type that have similar patterns and/or colors. By navigating to different categories, the user can also locate items of different types that may have the same, or similar, pattern and/or color information. For example, the user might see a long sleeve shirt with a pattern that the user likes, and can use the swatch and outline navigation to determine whether other shirts, such as polo shirts or t-shirts, have similar patterns and/or colors.

Such an approach can also enable a user to search in other categories that may or may not be related to the original search and/or the object itself. For example, in the situation 260 of FIG. 2(d) the user has navigated, using the user's finger 264 to swipe, to a women's shirts category. An updated outline 262 and swatch region can again be displayed over the image or live view, and updated search results can be displayed that show matching women's shirts. In other embodiments, a user might be able to perform a general search in order to locate various objects that match a specific pattern and/or color. For example, in the situation 280 of FIG. 2(e) an outline may or may not be displayed, but a guide 282 for a swatch region still enables a user to indicate the virtual swatch to be used for matching. In this way, the device can still quickly determine the relevant portion of the image without exerting significant effort for object identification and image segmentation, and can enable a query to be submitted or performed that searches for any relevant item that matches the virtual swatch information. The corresponding search results 284 can be displayed. In some embodiments, the search results can be displayed on a separate result page or other such display, where the live view and/or swatch guide are not displayed, in order to enable more search results to be displayed at one time. This can be particularly beneficial for devices such as smart phones or watches that may have a relatively small display. In some embodiments selection of a search result can cause the search to be adjusted to the corresponding category and/or related categories. In some embodiments the selection of a category returns only results in that category, while in other embodiments the category is a search criterion that is used with other criteria to attempt to locate the most relevant results. In such a situation, a search algorithm can use the category criterion to search and rank the results, which may or may not correspond to the particular category. In at least some embodiments, results from the specific category can be weighted to cause those results to be ranked more highly than other results. In some embodiments a user might be able to specify whether to only return results in a particular category, or whether the category is to be used as a guide. Various other options can be utilized as well within the scope of the various embodiments.

Figures 2D, 2E, 2F:
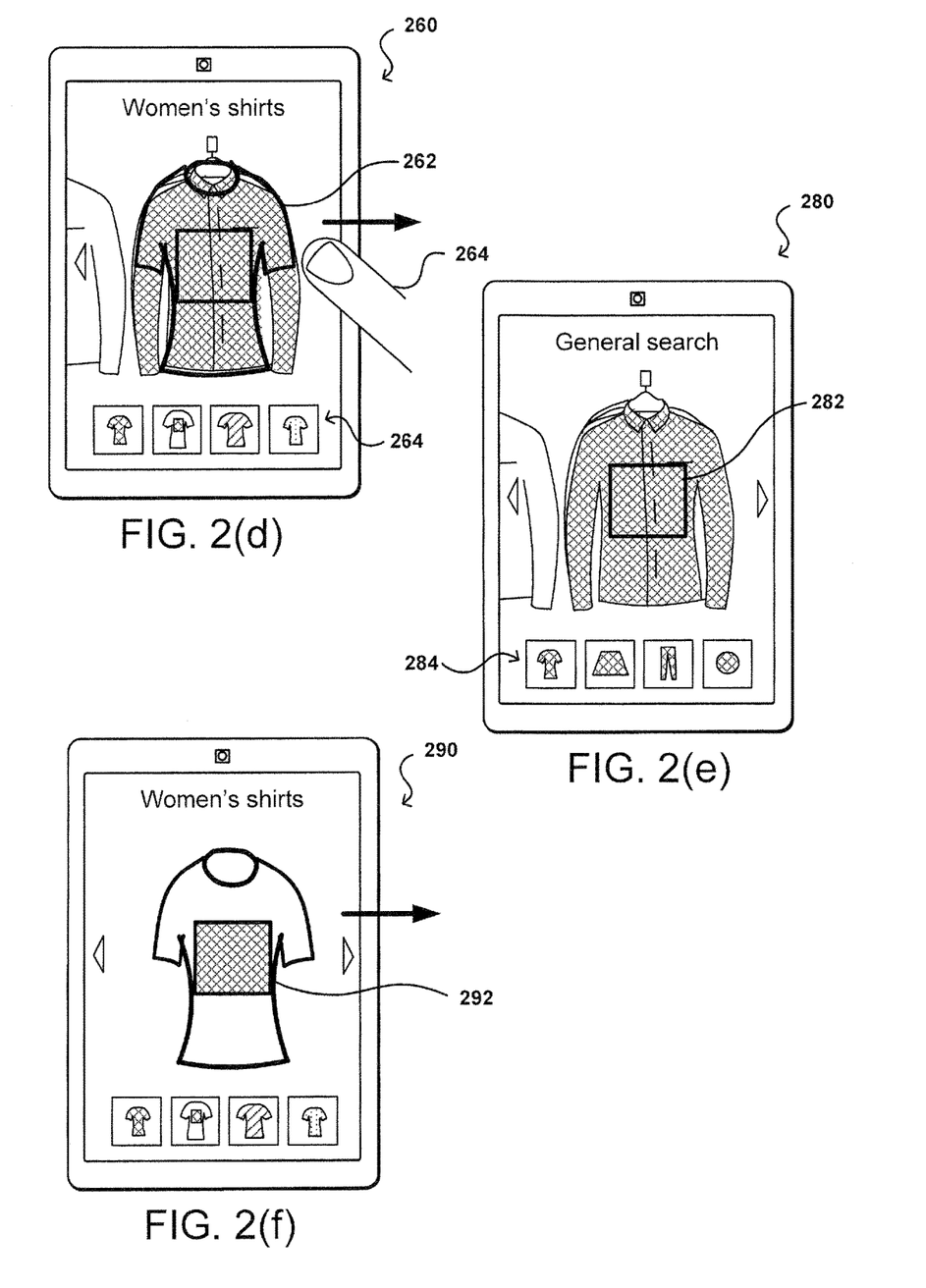

In some embodiments, where a "live" view of the image data being captured is displayed on a display of a device, the portion of the live view displayed is only that portion corresponding to the swatch region 292, as indicated in the example situation 290 of FIG. 2(f). An outline for the category can still be displayed, but the live view is restricted to the swatch region in order to remind the user to cause the pattern and/or color of interest to be represented in the swatch region. In some embodiments, a user can touch the screen, press a button, or otherwise indicate that the pattern and/or color of interest is represented by the swatch region in order to cause a query to be submitted and search results to be displayed. In other embodiments, attempts can be made to locate color and/or pattern information and update search results as the information in the swatch region changes, such as by at least a threshold amount, or at least in response to the image being substantially stable for a period of time. For example, if the device is stationary such that the image does not change significantly for at least a half a second, a query can be submitted to attempt to provide and/or update search results corresponding to the current swatch information.

In some instances, outlines for different categories might be similar. For example, an outline for a men's t-shirt category might look somewhat similar to an outline for a women's t-shirt category. Thus, in at least some embodiments differentiating information can be displayed as well. For example, text indicating the category might be used as previously illustrated. Alternatively, the color of the outline might change. For example, a blue outline might represent a men's category while pink might represent a women's category. Light blue might represent boy's wear and light pink girl's wear, among other such options. In some embodiments, a user might also be able to stretch or shrink the outline, such as by moving the fingers in or out on the display, in order to search for items of larger or smaller sizes, among other such options.

Enabling the user to search for certain types of items having similar colors and/or patterns can provide various advantages for a user. For example, the user can locate reviews or other information that can help the user to determine whether or not to purchase an item. The information also can enable the user to determine the sizes that are in stock, and the quantity that are in stock. The user can also determine other types of items with similar patterns available from that retailer or other retailers, and can compare pricing and availability information. Various other uses and advantages can exist as should be obvious in light of the teachings and suggestions contained herein.

Figure 3:
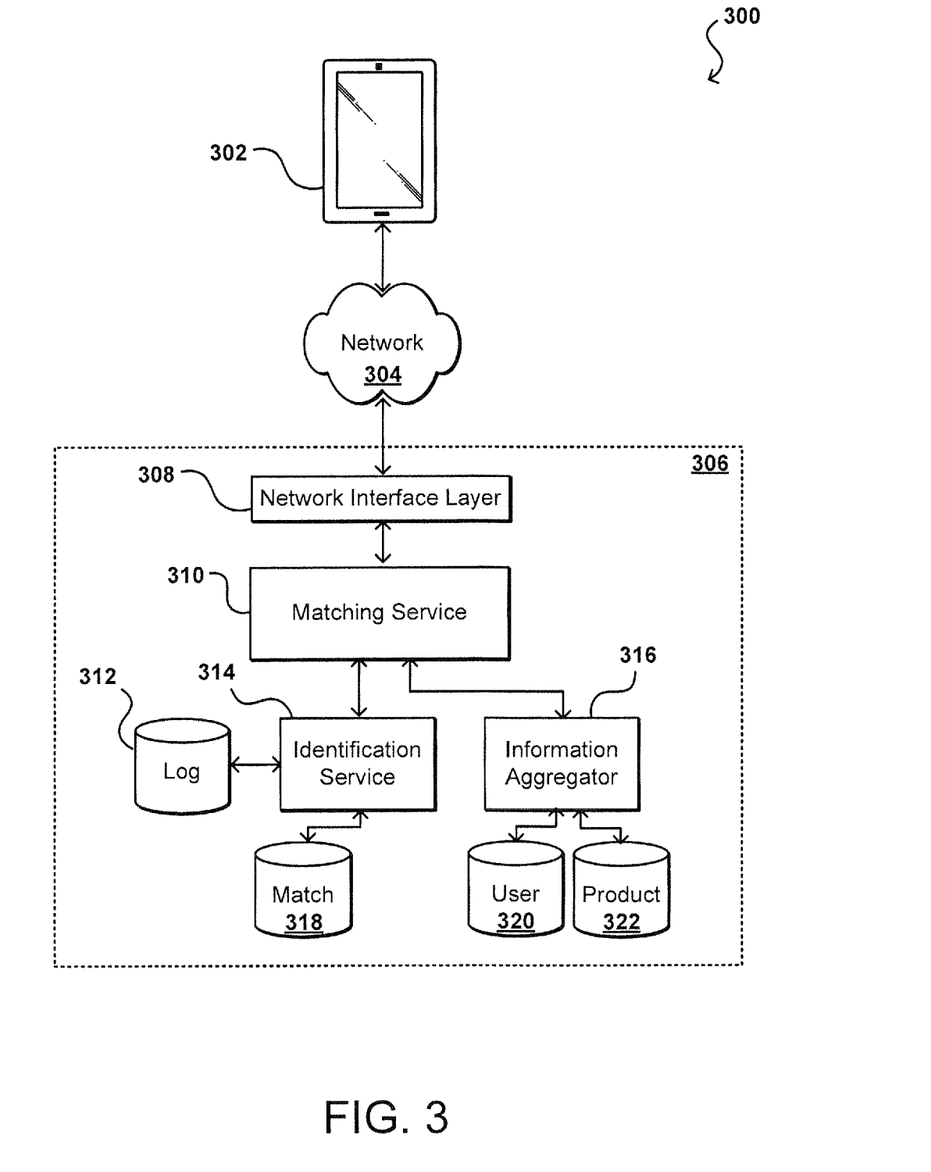
FIG. 3 illustrates example system for identifying items and providing information about those items that can be utilized in accordance with various embodiments.

FIG. 3 illustrates an example environment 300 in which information such as category information, swatch information, and/or any other appropriate search criteria can be submitted by a client device in order to attempt to obtain information for matching items as a set of search results or other such content. In this example, a user is able to specify a category or type of item, as well as a virtual swatch, using at least one computing device 302. For example, the computing device can send at least a portion of information across at least one appropriate network 304, such as may include the Internet, a local area network (LAN), a cellular network, and the like. The request can be sent to an appropriate content provider 306, as may provide one or more services, systems, or applications for processing such requests.

In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 310 as illustrated in FIG. 3. A matching service in this example includes components operable to receive swatch data for a type of item, analyze the swatch data, and return information relating to people, products, places, or things that are determined to match the swatch data within at least an acceptable amount of deviation, within an allowable matching threshold, etc.

The matching service 310 in this example can cause information to be sent to at least one identification service 314, device, system, or module that is operable to analyze the swatch data and attempt to locate one or more matches. In at least some embodiments, an identification service 314 will process the received data, such as to extract specific pattern and/or color features or values, then compare the processed data against data stored in a matching data store 318 or other such location. The data in an image matching data store 318 might be indexed and/or processed to facilitate with matching, as is known for such purposes.

The matching service 310 can receive information from each contacted identification service 314 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 316 can utilize the aggregated data from the matching service 310 to attempt to locate products, in a product data store 322 or other such location, which are offered through the marketplace and that match, or are otherwise related to, the potential match information. For example, if the identification service identifies a type of shirt with the desired pattern, the information aggregator can attempt to determine whether items of that type are offered through the marketplace, or at least for which information is available through the marketplace. In at least some embodiments, the information aggregator can utilize one or more suggestion algorithms or other such approaches to attempt to determine related elements that might be of interest based on the determined matches. In some embodiments, the information aggregator can return various types of data (or metadata) to the matching service, as may include item description, availability, reviews, and the like. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well. Information for located matches also can be stored in a user data store 320 of other such location, which can be used to assist in determining future potential matches or suggestions that might be of interest to the user. Various other types of information can be returned as well within the scope of the various embodiments.

The matching service 310 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components. It should be understood that, although the identification services are shown to be part of the provider environment 306 in FIG. 3, that one or more of these identification services might be operated by third parties that offer these services to the provider.

As mentioned, in at least some embodiments the user can provide at least some indication of the type of item for which the user is searching. This can be in response to a user navigating to a certain category, selecting a specific category, or launching search from within a particular category, among other such options. In other embodiments, the computing device can attempt to analyze the captured image data to determine the type of object being viewed, and can set the appropriate category for search. Any other appropriate information useful for determining the type of item can be utilized as well, such as information about a type of store the user is in based upon geographic data, network connectivity, and the like. In some embodiments a best guess can be used to present a first outline to the user, which the user can then adjust using a swipe motion or other such approach as discussed elsewhere herein. In other embodiments, the device might display a set of potential outlines and enable the user to select the closest outline to start with.

When the user swipes or performs another navigation input to cause another category to be selected and outline displayed, the order in which outlines are displayed can vary by embodiment. For example, in some embodiments the categories might always update in the same order, such that swiping right from a t-shirt category always moves directly to a polo shirt category. Such an approach enables the user to become familiar with the ordering and be better able to navigate to a specific category of interest. In other embodiments, a dynamic determination can be made based upon various factors in order to determine which category outline to next display, based on a determined or estimated relevance. For example, a specific user might purchase certain types of shirts, certain types of shirts might be more likely to be purchased in certain times of year, a user might have shown recent interest in certain types of shirts, or any of a number of various other data values might be available that might enable the device (or software running on or remote from the device) to determine the appropriate order in which to display the outlines, such that the most likely category outlines are displayed before less likely outlines as the user scrolls or navigates through the outlines. In some embodiments, a user might be able to swipe left and right to navigate to other sub-categories within a category, such as polo shirts or t-shirts within a men's shirt category, and might be able to swipe up and down to switch between categories, such as to go from men's shirts to men's jackets or women's shirts. As with the sub-categories, the categories can also be fixed in order or ordered according to a dynamic determination based at least in part upon currently available information indicative of user interest.

In at least some embodiments, the pattern and/or color match process can advantageously be invariant to a variety of factors. For example, it can be desirable that the pattern match be invariant to rotation or orientation, such that the way in which the material is cut or arranged does not impact the accuracy of the search. The rotational invariance may be limited, however, as it might be desirable to match horizontal stripes within five to ten degrees of rotation, but it might not be desirable to match an item with vertical stripes. It also can be desirable to make the process at least somewhat invariant to noise from the camera. Factors such as lighting, exposure and gain settings, motion, and the like can affect the apparent color and/or texture of an item. Thus, it can be desirable to allow the search to consider colors, textures, and other such values over a somewhat wider range, in order to compensate for differences between the actual color and the apparent color in an image.

In order to allow for some variance in pattern, at least some embodiments can utilize approaches or algorithms that utilize local features or other such representative points to represent a pattern. These features then can be used in a search vocabulary and a list of potential words created. A matching process then can attempt to compare images based on the distribution of different visual words present in representative swatches, using a bag of words description. In some embodiments, a corners detector process can be used to attempt to find the strongest corners for a given swatch, and then compare against the corresponding corners of swatches in the database. For a database that contains swatches for items available, this can allow for a quick comparison based on type, pattern, and/or color without having to try to match against an entire database of images. Various descriptors can be used for the match process, as may include pattern, texture, and/or color descriptors, among others.

In some embodiments, the matching process might also include a general image match process. Such an approach can be advantageous in situations such as where the pattern corresponds to an image on a t-shirt, which might correspond to a movie character or musical artist. If the character or artist can be recognized, the search results can be modified to include other types of items that include representations of the character or artist. For example, the user might look for a t-shirt matching a picture of a television character, and the search results might include t-shirts that include other pictures of that character that might not correspond, from a feature match perspective, the query image swatch.

Figure 4:
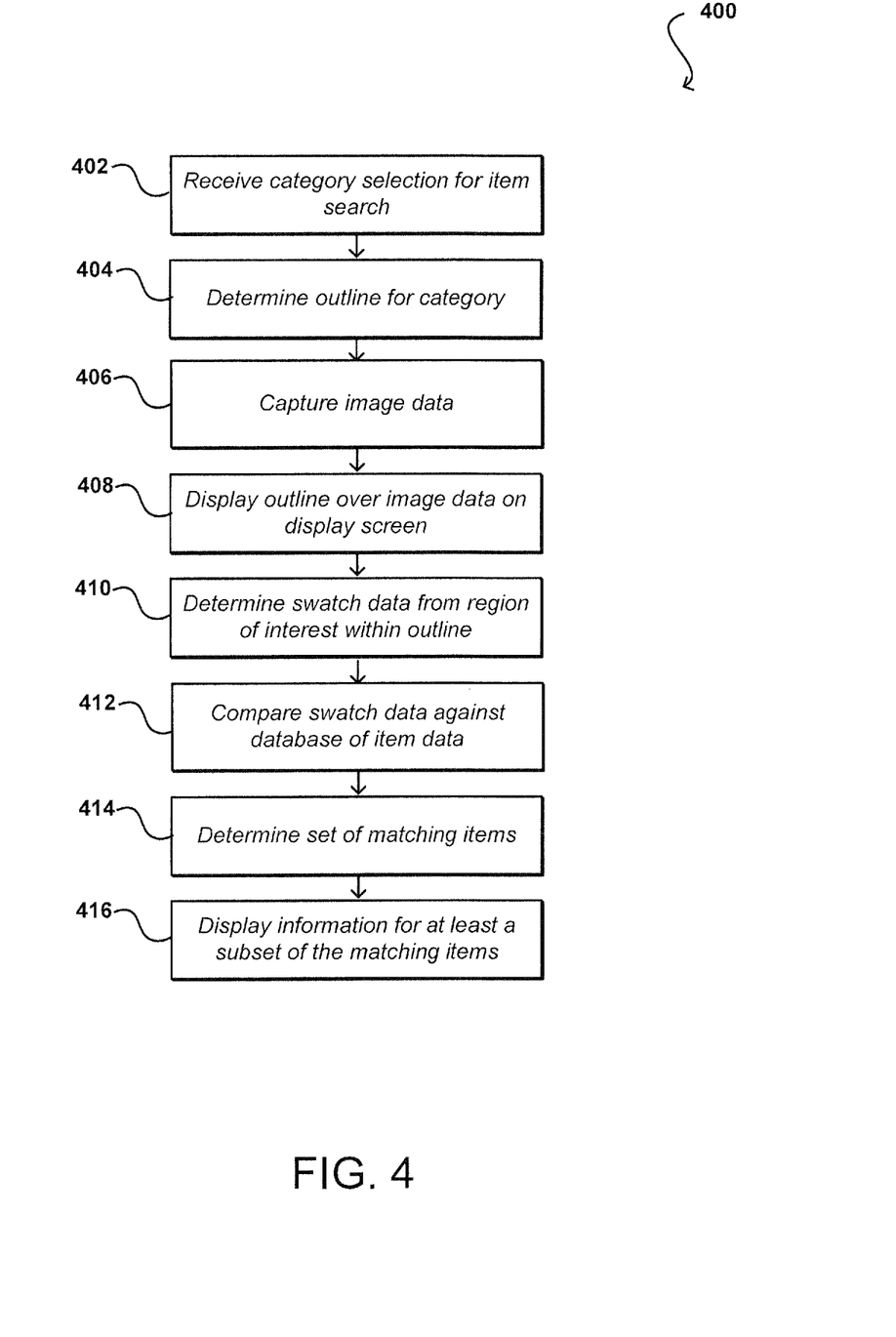
FIG. 4 illustrates a first example process for performing a search that can be utilized in accordance with various embodiments.

FIG. 4 illustrates an example process 400 for performing a category-related search using a designated portion of captured image data that can be utilized in accordance with various embodiments. It should be understood that there can be additional, fewer, or alternative steps performed in similar or alternative orders, or in parallel, within the scope of the various embodiments unless otherwise stated. In this example, a category selection is received 402 for use in an item search process. As discussed, in at least some embodiments the category can be specified by the user selecting or navigating to a specific category, among others. An appropriate outline can be determined 404 for that category, such as the outline of a men's polo shirt in response to a selection of a men's polo shirt category. Image data, as may include still image or video data, can be captured 406 by a camera of a computing device, with the image data being captured before, after, or concurrently with the category selection and outline determination in various embodiments. At least a portion of the image data can be displayed 408 on a display of the computing device, with the outline being displayed "over" the image data on the display.

The user can have the ability to move the computing device and/or object until a pattern and/or color of interest is visible within the swatch region of the outline. The swatch data (i.e., the pixel data from pixels of the image contained within the swatch region) can be determined 410, which can include pixel values, corner values, or feature values, among other options discussed and suggested herein. In many embodiments the swatch data and information for the selected category can be uploaded (or otherwise transmitted as a query) to a matching system or service, for example, whereby the swatch data can be compared 412 against a database of item data, or swatch data for those items. Based at least in part upon the swatch data comparison, a set of matching items can be determined 414 and information for at least a subset of those matching items transmitted to the computing device. The computing device can then display 416, as search results, information for at least a subset of the matching items.

Figure 5:
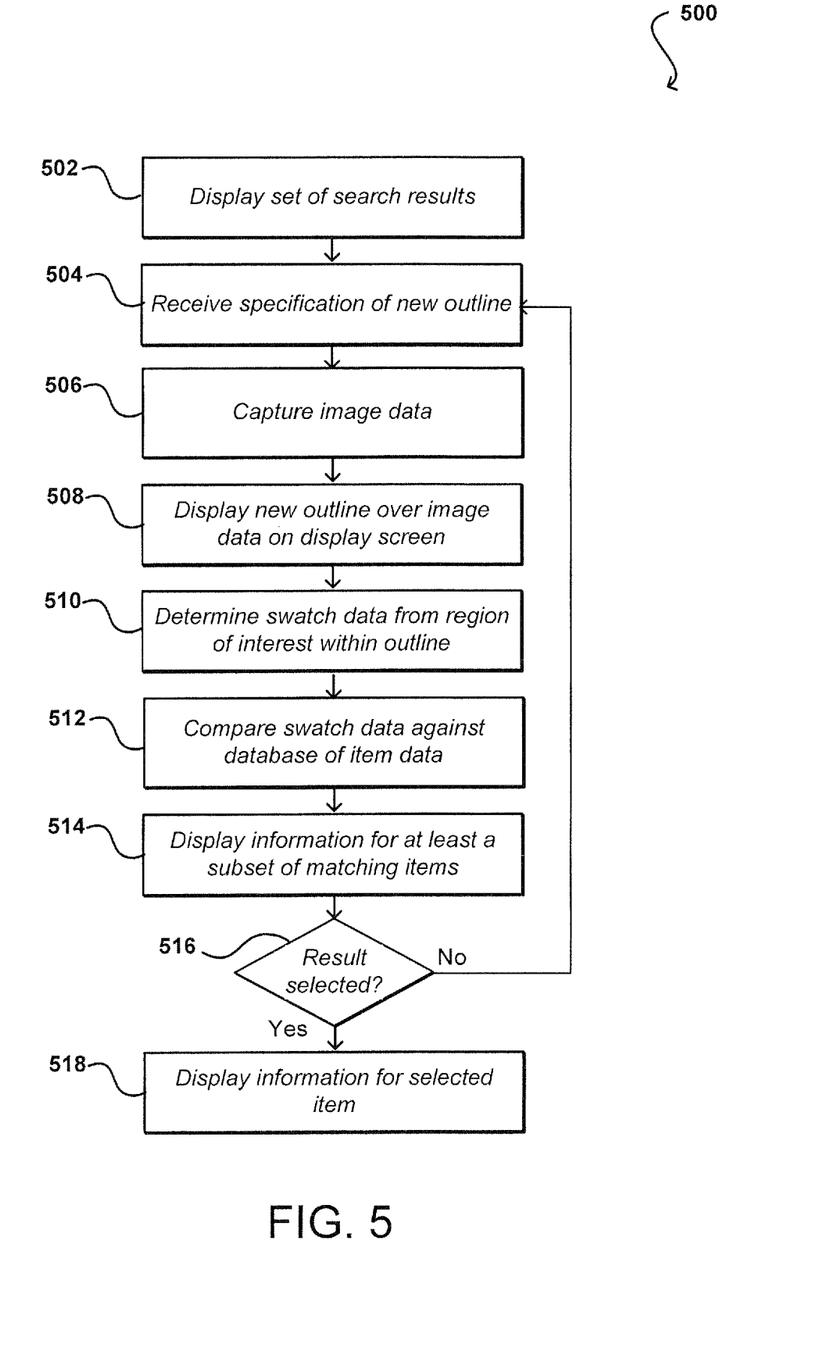
FIG. 5 illustrates a second example process for performing a search that can be utilized in accordance with various embodiments.

It might be the case, however, that the user wishes to view search results from another category. An example process 500 for enabling a user to view such results is illustrated in FIG. 5. In this example, a first set of search results is displayed 502, such as may be the result of the process discussed with respect to FIG. 4. While displaying the results, a specification of a new outline can be received 504, such as may be the result of the user swiping a finger across the screen, to cause a different category outline to be displayed, or selecting and moving one or more control points in order to adjust the shape of the displayed outline. As with the previous process, image data can be captured 506 before, after, and/or concurrently with the specification of the new outline. The new outline can be displayed 508 over the image data on the display screen, and swatch data determined from the region of interest within the outline. In some embodiments where still images are used or the video information has not substantially changed, for example, a new query can be submitted that includes the updated category and/or outline information without submitting a new set of swatch data, in order to conserve bandwidth. In other cases, updated swatch data can be determined 510 from the swatch region, and the swatch data submitted with a new query to the matching system or service. The updated swatch data can be compared 512 against the swatch and/or item data in the database using the new criteria, and a new set of matching items determined. Information for at least a subset of the matching items can be provided to the device and at least a subset of that information displayed 514 on the display screen of the computing device. If a result is not selected, another category can be selected and the process can continue. If a search result is selected 516, information for the selected item can be displayed 518, such as may provide pricing, availability, and/or review information, along with the ability to purchase or locate the item in at least some embodiments.

In some embodiments, the outline can also change as information is obtained that provides insight into the type of item for which the user is searching. For example, if a user selects a generic shirt category but looks mostly at short sleeve shirts, the outline can be animated to move toward a short sleeve shirt outline. The user can also "throw" the style at the outline, such as by seeing a short sleeve shirt in the search results and then holding the user's finger down on the screen over the search result and moving the user's finger towards the outline, which can provide input that the outline should change to the style of the selected shirt. In some embodiments the user can have the ability to modify the outline by "dragging" or selecting a point or portion of the image and then causing that point or portion to be moved, which then can cause a closest matching outline and/or category to be selected, among other such options.

It should be understood that while many of the examples related to end users, such as customers of an electronic marketplace, various other types of users can benefit from such functionality as well. For example, buyers of a marketplace may want to use such a service to determine whether their marketplace is already selling a similar item. Alternatively, the buyer might want to see if there are other items with the same or similar color or pattern that the buyer might want to purchase. Various other users can take advantage of the functionality as should be apparent in light of the teachings and suggestions contained herein.

Figure 6:
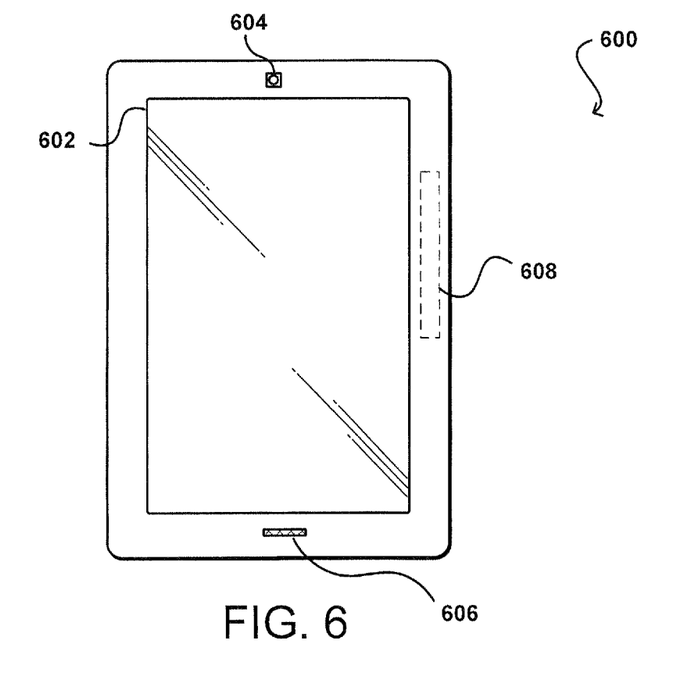
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). The computing device in this example includes at least one camera 604 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 600 also includes at least one microphone 606 or other audio capture device capable of capturing audio data, such as words or commands spoken by a user of the device. In this example, a microphone 606 is placed on the same side of the device as the display screen 602, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 600 also includes at least one orientation sensor 608, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 7:
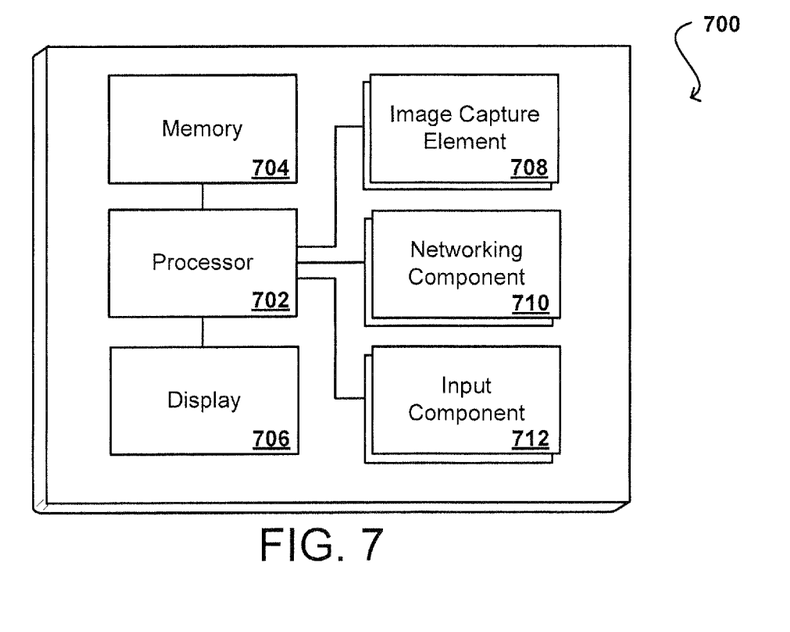
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one image capture element 708 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input component 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor or component 710. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

As an example, a computing device such as that described with respect to FIG. 6 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 8:
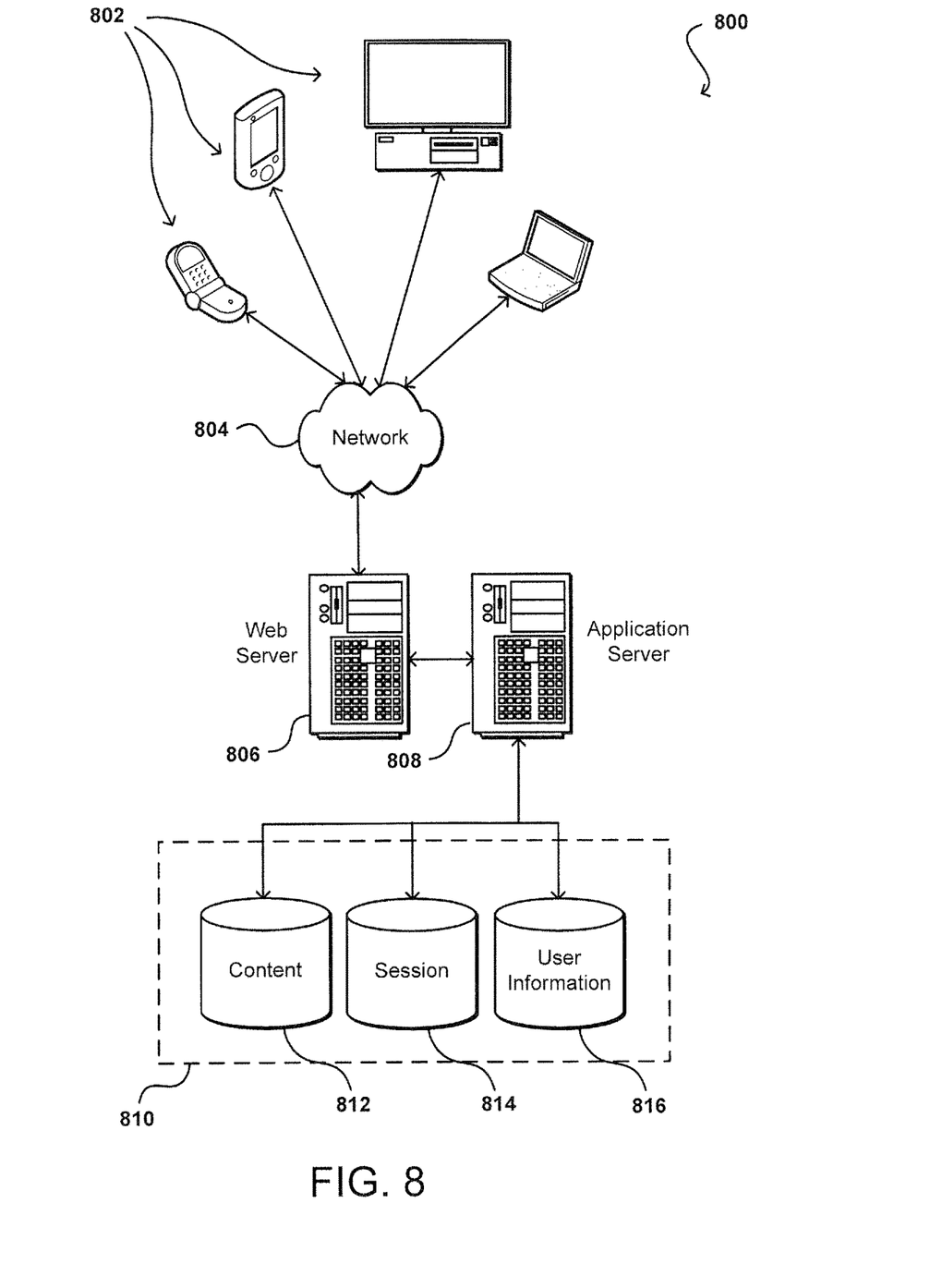
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    at least one processor;
    a camera configured to capture image data over a field of view;
    a display screen; and
    memory including instructions that, when executed by the at least one processor, cause the computing device to:
    capture the image data using the camera, the image data including a representation of an object of interest;
    receive, from a user of the computing device, a selection of a category in which to search for items related to the object of interest;
    display a graphical outline in response to the selection of the category, corresponding to a type of item in the category, on the display screen overlying an image generated using the image data, the graphical outline indicating a target relative orientation of the object of interest to the computing device;
    display a swatch guide on the display screen, the swatch guide positioned within an interior of the graphical outline and indicating a region of the field of view of the camera in which to position a portion of the object of interest, the portion including swatch data representing at least one of a texture, color, or pattern for which the user wants to search;
    cause a query to be executed against a data source, the query including information for the category and the swatch data;
    receive, in response to the query, result information for a set of items, the set of items determined by comparing the swatch data to stored swatch data for a plurality of items related to the category; and
    display, on the display screen, information for at least a subset of the set of items.

2. The computing device of claim 1, wherein the instructions when executed further cause the computing device to:
    receive, from the user of the computing device, a selection of a new category in which to search for items related to the object of interest;
    display a new graphical outline, corresponding to a type of item in the new category, on the display screen overlying a new image generated using the image data, the new graphical outline indicating a target relative orientation of the object of interest to the computing device;
    display a new swatch guide on the display screen, the new swatch guide positioned within an interior of the new graphical outline and indicating a region of the field of view of the camera in which to position the portion of the object of interest, the portion including new swatch data;
    cause a new query to be executed against the data source, the new query including information for the new category and the new swatch data;
    receive, in response to the new query, new result information for a new set of items, the new set of items determined by comparing the new swatch data to the stored data for a plurality of items related to the new category; and
    display, on the display screen, information for at least a subset of the new set of items.

3. The computing device of claim 1, wherein the selection of the category is based at least in part upon a user swiping a finger across the display screen to select the graphical outline from a plurality of graphical outlines, each of the plurality of graphical outlines corresponding to a respective type of item in a respective category.

4. The computing device of claim 1, wherein the instructions when executed further cause the computing device to:
    generate the swatch data by analyzing only the portion of the object of interest corresponding to a region inside the swatch guide.

5. A computer-implemented method, comprising:
    capturing image data using a camera of a computing device;
    displaying at least a portion of the image data on a display screen of the computing device;
    displaying a graphical outline on the display screen display in response to a selection of a category for a type of item, the graphical outline corresponding to the category for the type of item and indicating a target orientation of an object of interest represented in the image data;
    extracting swatch data representing at least one of a texture, color, or pattern for which a user wants to search from a region of the image data within an interior of the graphical outline; and
    causing a query to be transmitted to obtain a set of search results, the query including information for the category and the swatch data, the swatch data capable of being matched against stored swatch data for each of a plurality of items.

6. The computer-implemented method of claim 5, further comprising:
    receiving, in response to the query, result information for a set of items, the set of items determined by comparing the swatch data to the stored swatch data; and
    displaying, on the display screen, information for at least a subset of the set of items.

7. The computer-implemented method of claim 6, wherein displaying the information for at least a subset of the set of items includes switching to a result view wherein the graphical outline is not displayed.

8. The computer-implemented method of claim 5, further comprising:
    receiving, from the user of the computing device, a selection of a new category in which to search for items related to the object of interest;
    displaying a new graphical outline, corresponding to a type of item in the new category, on the display screen overlying a new image generated using the image data, the new graphical outline indicating a target relative orientation of the object of interest to the computing device;

extracting new swatch data within an interior of the new graphical outline;

causing a new query to be executed against the data source, the new query including information for the new category and the swatch data;

receiving, in response to the new query, new result information for a new set of items, the new set of items determined by comparing the new swatch data to the stored data for a plurality of items related to the new category; and displaying, on the display screen, information for at least a subset of the new set of items.

9. The computer-implemented method of claim 8, further comprising:

displaying, on the display screen, at least one user-selectable facet, the at least one user-selectable facet enabling a user to specify at least one additional criterion to be used to query for updated result information.

10. The computer-implemented method of claim 5, further comprising:

analyzing respective image data for each of the plurality of items;

determining respective swatch data for each of the plurality of items based at least in part upon the respective image data; and storing the respective swatch data as the stored swatch data for use in matching against the swatch data extracted from the captured image data.

11. The computer-implemented method of claim 5, wherein the graphical outline includes an outer portion, corresponding to a shape of at least one type of item in the category, and an inner portion, indicating the region of the image data from which to extract the swatch data.

12. The computer-implemented method of claim 5, further comprising:

determining the category by at least one of detecting user input or recognizing a type of the object of interest as represented in the image data.

13. The computer-implemented method of claim 5, further comprising:

enabling the user to navigate through categories in a first direction and sub-categories in an orthogonal direction.

14. The computer-implemented method of claim 5, further comprising:

enabling a user to adjust a shape of at least a portion of the graphical outline; and causing a new query to be executed against the data source in response to a change in shape of at least a portion of the graphical outline, the new query including information corresponding to the change in shape.

15. The computer-implemented method of claim 5, further comprising:

generating the swatch data by processing the region of the image data from which to extract swatch data with an algorithm that is substantially invariant to at least one of rotation, noise, and pattern variance, the swatch data including at least one of a texture, color, or pattern for which to search.

16. A non-transitory computer-readable storage medium including instructions that, when executed by at least one processor of a computing system, cause the at least one processor to:

receive, from a computing device, a query specifying a category and including swatch data, the swatch data including information for at least one of a pattern, a color, or a texture with which to search as extracted from an image captured by a camera of the computing device;

display a graphical outline in response to a selection of the specified category, the graphical outline corresponding to the category and indicating a target orientation of an object of interest represented in the image data;

extract the swatch data from a region of image data within an interior of the graphical outline;

compare the received swatch data to stored swatch data for each of a plurality of items in at least the category;

determine a ranked set of search results, from the plurality of items, including information determined to correspond to the swatch data; and transmit, in response to the query, information for at least a subset of the ranked set of search results.

17. The non-transitory computer-readable storage medium of claim 16, wherein the instructions when executed further cause the at least one processor to:

analyze each of the plurality of items in at least the category to generate the stored swatch data.

18. The non-transitory computer-readable storage medium of claim 16, wherein the instructions when executed further cause the at least one processor to:

receive, from the computing device, a new query specifying a new category and including new swatch data;

compare the new swatch data to stored swatch data for each of a plurality of items in at least the new category;

determine a new ranked set of search results, from the plurality of items, including information determine to correspond to the swatch data; and transmit, in response to the query, information for at least a subset of the new ranked set of search results.

19. The non-transitory computer-readable storage medium of claim 16, wherein the instructions when executed further cause the at least one processor to:

analyze the swatch data using an algorithm that is invariant to at least one of rotation, noise, or pattern variance.

20. The non-transitory computer-readable storage medium of claim 16, wherein the instructions when executed further cause the at least one processor to:

determine, based at least in part upon analyzing the swatch data, an appropriate category for the item of interest; and transmit information about the appropriate category with at least the subset of the ranked set of search results.

* * * * *